United States Defensive Publication [19] (H) [11] T991,001

Donovan et al. [43] Mar. 4, 1980

[54] PREFORMED HOT-MELT SEALANT STRIP

[76] Inventors: Leonard D. Donovan, 12 High St., Southboro, Mass. 01772; Matthew M. Sitter, 22 Colonial Dr., Convert Station, N.J. 07961

[21] Appl. No.: 19,270

[22] Filed: Mar. 9, 1979

[51] Int. Cl.[2] ..... B32B 17/10; C09J 7/02; C03C 27/10

[52] U.S. Cl. ..... 428/40; 156/106; 156/107; 156/109; 156/309; 428/83; 428/349; 428/352

[57] ABSTRACT

A preformed or prefabricated hot melt sealant strip of essentially any desired length and with any desired cross-sectional configuration is formed by hot extrusion, cooled, and coiled or spooled and may be subsequently used, for example, as a sealing means in the assembly of multiglazed windows, to seal and set automobile windshields and the like. The preferred cross-section is U-shaped if the sealant strip is to be utilized for multiglazed windows but the strip may have a T, E, L shape, or the like, depending on the intended end use. Any hot melt adhesive or sealant composition is suitable as long as it is not too tacky in the cooled state. Some tackiness is acceptable but it requires the use of an abherent or release liner if the strip is to be packaged in such a manner that it is in contact with itself. The sealant strip may then be placed about a dessicant filled spacer element and located between two panes of glass. The sealant may then be activated by subjection to thermal energy to seal the unit.

6 Claims, No Sheets Drawing,

7 Pages Specification

The file of this unexamined application may be inspected and copies thereof may be purchased (849 O.G. 1221, Apr. 9, 1968).